(12) United States Patent
Nugraha et al.

(10) Patent No.: US 12,437,910 B2
(45) Date of Patent: Oct. 7, 2025

(54) ACTIVE HAPTIC FEEDBACK DEVICE, HUMAN MACHINE INTERFACE AND AUTOMOTIVE PART

(71) Applicant: Motherson Innovations Company Ltd., London (GB)

(72) Inventors: Thomas Agung Nugraha, Stuttgart (DE); David-Kenneth Jaeger, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 18/905,463

(22) Filed: Oct. 3, 2024

(65) Prior Publication Data
US 2025/0182945 A1 Jun. 5, 2025

(30) Foreign Application Priority Data
Dec. 5, 2023 (DE) ............... 10 2023 134 035.2

(51) Int. Cl.
*H01F 7/08* (2006.01)
(52) U.S. Cl.
CPC .................. *H01F 7/081* (2013.01)
(58) Field of Classification Search
CPC ..... H01F 7/081; B60K 35/25; G06F 3/03547; G06F 3/016
(Continued)

(56) References Cited

U.S. PATENT DOCUMENTS 10,951,104 B2 * 3/2021 Takeda ............... H02K 41/031
2011/0101796 A1 * 5/2011 Odajima ............. H02K 33/16
310/25

(Continued)

FOREIGN PATENT DOCUMENTS

DE 10 2015 008 537 1/2017
EP 3888806 10/2021

OTHER PUBLICATIONS

German Patent and Trademark Office, Appl. 10 2023 134 035.2, Office Action, Jun. 14, 2024.

*Primary Examiner* — Shawki S Ismail
*Assistant Examiner* — Lisa N Homza
(74) *Attorney, Agent, or Firm* — Jones Day

(57) ABSTRACT

The present disclosure relates to an active haptic feedback device for a human machine interface, comprising a fixed part, a moveable part and a vibrating plate, wherein the fixed part comprises a coil winding on a bobbin and through which a coil core extends, which is fixed to a base plate; the moveable part comprises a ferromagnetic plate arranged between the coil core and the base plate, wherein the ferromagnetic plate has a resting state, when no current is applied to the coil winding, with a gap between the ferromagnetic plate and the coil core, and an activation state, when current is applied to the coil winding, with the gap being reduced due to a movement of the ferromagnetic plate away from the base plate and towards the coil core, and the vibrating plate is arranged on the side of the coil core opposite to the side of the ferromagnetic plate such that the coil core is extending at least partly between the vibrating plate and the ferromagnetic plate, wherein the vibrating plate is fixedly attached to the ferromagnetic plate and moveably attached to the base plate via spring means, wherein the spring means are configured to bring back the ferromagnetic plate to its resting position when no current is applied to the coil winding, from its activation position.

11 Claims, 5 Drawing Sheets

(58) Field of Classification Search
USPC .......................................................... 335/282
See application file for complete search history.

(56) References Cited

U.S. PATENT DOCUMENTS

2018/0076702 A1* 3/2018 Mori ...................... H02K 33/18
2019/0305630 A1    10/2019 Mori et al.

* cited by examiner

ACTIVE HAPTIC FEEDBACK DEVICE, HUMAN MACHINE INTERFACE AND AUTOMOTIVE PART

CROSS-REFERENCE TO RELATED APPLICATION

This application claims priority to German Patent application No. DE 10 2023 134 035.2, filed on Dec. 5, 2023, the entirety of which is incorporated herein by reference.

FIELD

The present disclosure relates to an active haptic feedback device for a human machine interface comprising a fixed part, a moveable part and a vibrating plate; a human machine interface with at least one such device; and an automotive part with at least one such human machine interface.

BACKGROUND

Active haptic feedback is often required in a modern human machine interface (HMI). This not only to replace physical buttons, but also to give physical cues as feedback to a user related to his/her input. In the following, an active haptic feedback device will also be called "haptic actuator." Such a haptic actuator needs to be embedded underneath a surface and within an enclosure active to provide a HMI.

There are several haptic actuators available on the market. An overview over some differences between known actuators, comprising piezo actuators, more traditional eccentric rotating mass (ERM) motors, linear resonant actuators (LRA), direct drive actuators (DDA) and solenoid actuators which utilize electromagnetism to convert electrical energy into mechanical motion.

Most of the known actuators require a sophisticated mechanical decoupling. Mechanical decoupling needs to assure efficient energy transfer from the haptic actuator to a user's finger, while assuring components robustness and durability.

Most commonly used mechanical decoupling concepts rely on decoupling elements. Such decoupling elements may
  isolate an enclosure of a HMI box relative to an external frame such that the complete box needs to vibrate, which requires a relatively high energy for vibrations reaching a user's finger; or
  isolate minimum components by being arranged inside a HMI box such that the amount of components absorbing energy generated by a haptic actuator is reduced, with
    either a floating design of the actuator resulting in the force generated by the generator may not be efficiently transferred to the HMI surface,
    or the actuator pushing against a non-moving base, which leads to improvement in efficiency.

Each decoupling concept needs to consider not only efficiency of vibration energy transfer and product durability, but also the size of product and haptic feedback uniformity across the surface. These aspects make an implementation of haptic actuators more challenging for HMI products inside a vehicle.

EP 3 888 806 A1 describes a control device which outputs a drive signal to a haptic actuator being a DDA and supplies a drive current so that vibrations corresponding to touch operations are generated. The haptic actuator comprises a fixed part having a base part and a core assembly formed by a winding coil around a core; a movable part having yokes of magnetic material; and plate-shaped elastic parts elastically support by the movable part to be movable in the vibrating direction with respect to fixed part. But the vibration is in the Z minus direction ("down"), which reduces an energy transfer to a surface on a top.

SUMMARY

There is a need to further improve haptic actuators. Thus, the object of the present disclosure is to further develop the known active haptic feedback device for a human machine interface, in particular for usage in a vehicle, to overcome the drawbacks of the prior art.

This object is achieved in that the fixed part comprises a coil winding on a bobbin and through which a coil core extends, which is fixed to a base plate; the moveable part comprises a ferromagnetic plate arranged between the coil core and the base plate, wherein the ferromagnetic plate has a resting state, when no current is applied to the coil winding, with a gap between the ferromagnetic plate and the coil core, and an activation state, when current is applied to the coil winding, with the gap being reduced due to a movement of the ferromagnetic plate away from the base plate and towards the ferromagnetic plate, and the vibrating plate is arranged on the side of the coil core opposite to the side of the ferromagnetic plate such that the coil core is extending at least partly between the vibrating plate and the ferromagnetic plate, wherein the vibrating plate is fixedly attached to the ferromagnetic plate and moveably attached to the base plate via spring means, wherein the spring means are configured to bring back the ferromagnetic plate to its resting position when no current is applied to the coil winding, from its activation position.

Embodiments of the present disclosure may be characterized in that the coil core comprises ferromagnetic material; the vibrating plate is made of non-ferromagnetic material; and connection means are made of non-ferromagnetic material.

It is also proposed that the spring means comprise leaf springs, at least one on each side of the coil winding perpendicular to the extension of the coil core.

In addition, embodiments nay be described in that the gap is up to 300 μm in the resting state.

Still further, it is proposed that the active haptic feedback device has a length of up to 60 mm, a width of up to 45 mm and a height of up to 12.5 mm.

It is also proposed that damping means are arranged between the ferromagnetic plate and the base plate and/or damping means are arranged between the coil core and the ferromagnetic plate.

The present disclosure also provides a human machine interface with at least one active haptic feedback device according to the present disclosure.

For that human machine interface it is proposed that a touch surface is arranged on the vibrating plate of the at least one active haptic feedback device, such that movement of the vibrating plate together with the ferromagnetic plate from the resting state to the activation state is in the direction towards the touch surface.

Embodiments of such a human machine interface may also be characterized in that a printed circuit board with at least one incorporated sensor and a substrate are arranged between the touch surface and the at least one active haptic feedback device.

Still further, it is proposed that at least one button associated with an active haptic feedback device; at least one slide associated with at least two active haptic feedback devices; and/or at least one touchpad area associated with at least two active haptic feedback devices.

Finally, the present disclosure also provides an automotive part with at least one human machine interface according to the present disclosure.

To overcome the drawbacks of known haptic actuators, the present disclosure is based on considering simplification of mechanical design and eliminating a need of complicated external mechanical decoupling. A haptic actuator is provided with the following unique characteristics:

Mechanical decoupling on the actuator itself, which increases efficiency;
Design easiness since eliminating external mechanical decoupling is advantageous from a mechanical design point of view;
No need of any permanent magnet, which lowers costs;
Designed to vibrate in the Z positive direction ("upward"), which increases efficiency;
No strong spring requirement, which reduces energy loss from spring;
Self-support mechanical decoupling design such that no external support to endure excessive force from the top is needed;
Reduced footprint which allows multiple placement on HMI area; and
Multiple actuator distributions across HMI area are possible.

BRIEF DESCRIPTION OF THE DRAWINGS

The foregoing summary, as well as the following detailed description, will be better understood when read in conjunction with the appended schematic drawings. For the purpose of illustration, certain examples of the present disclosure are shown in the drawings. It should be understood, however, that the present disclosure is not limited to the precise arrangements and instrumentalities shown. Rather, the drawings, together with the detailed description, serve to explain advantages and principles consistent with the present disclosure, wherein:

FIG. 1b is another perspective view of the haptic actuator of FIG. 1a;

FIG. 3b is a cross-sectional view taken along the line X-X' in FIG. 3a;

FIG. 3c is a cross-sectional view taken along the line Y-Y' in FIG. 3a;

DETAILED DESCRIPTION

Figure 1A:
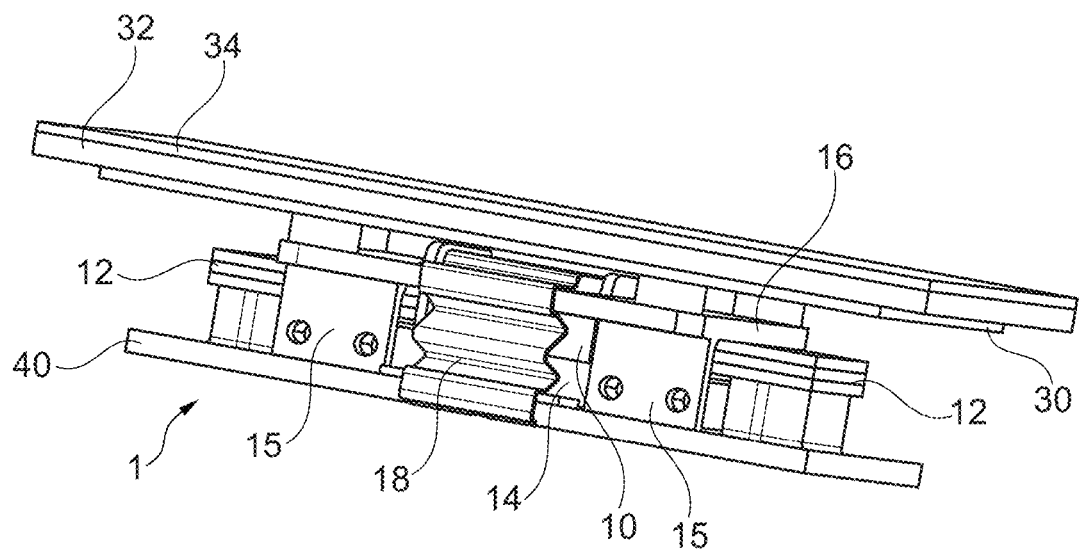
FIG. 1a is a perspective view of a HMI with a single haptic actuator according to the present disclosure.
Figure 1B:
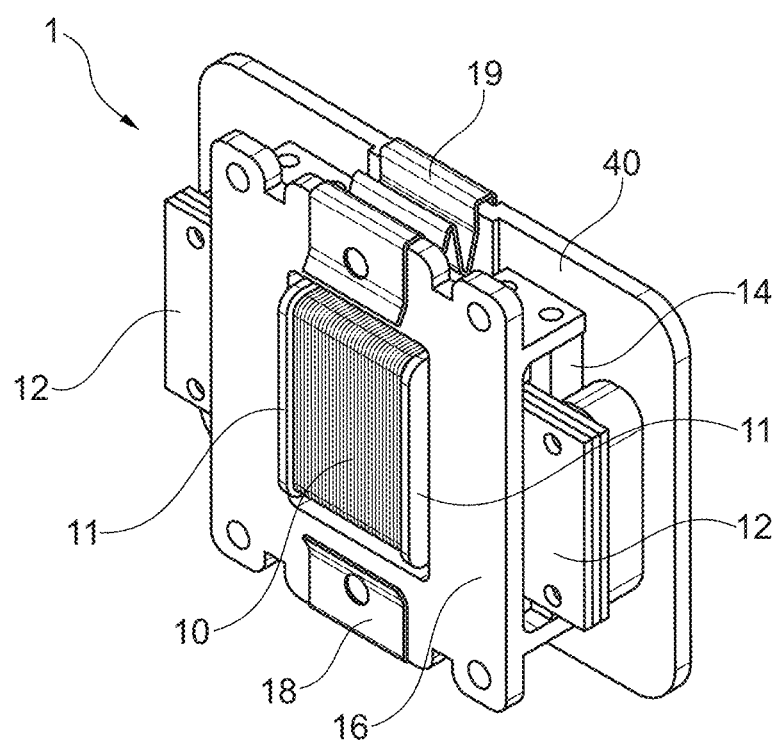
Figure 2A:
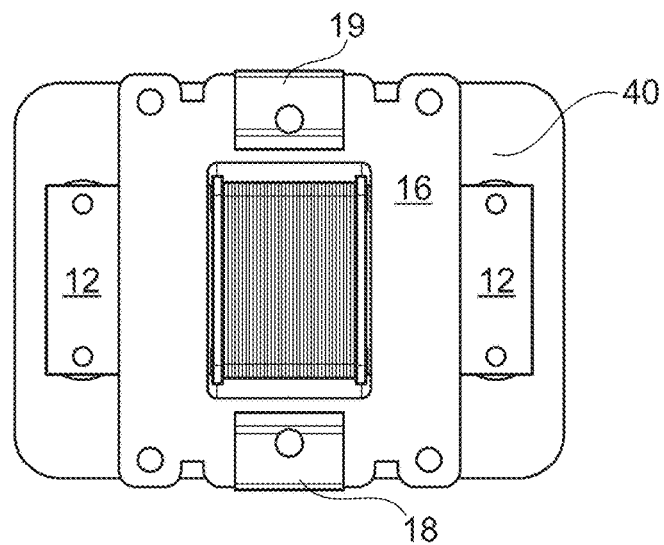
FIGS. 2a to 2e are a top view, a front view, a back view, a side view and a bottom view of the haptic actuator of FIG. 1b, respectively.
Figure 2B:
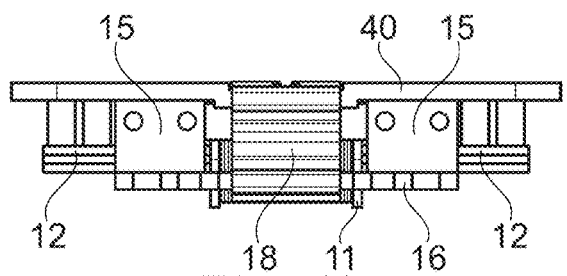
Figure 2C:
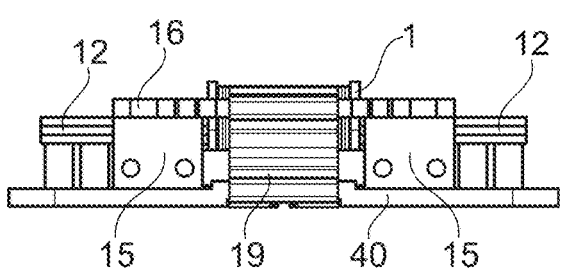
Figure 2D:
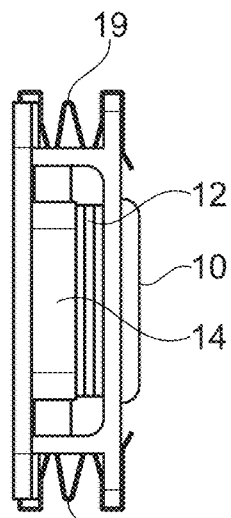
Figure 2E:
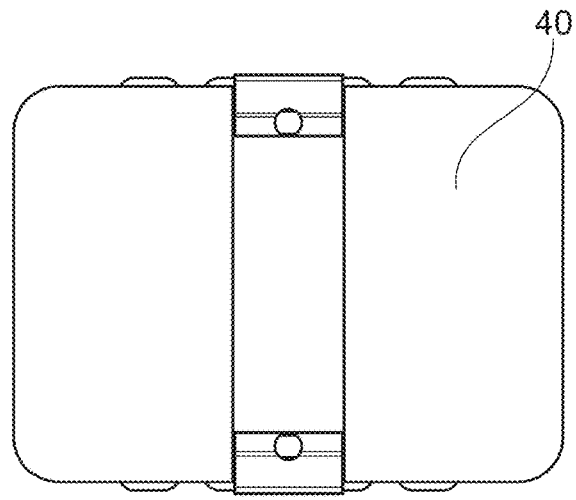

As can be seen in FIG. 1a, a HMI according to the present disclosure may comprise a haptic actuator 1 attached to a top touch surface 34 via a printed circuit board 30 with incorporated sensor and a substrate 32. The sensor may be a capacitive sensor or any other type of force sensor, like a piezo, strain gauge, or force sensing resistor (FSR) sensor. The substrate 32 may be a stiff material like PMMA, PET, ABS or other plastics or a soft material like a foam, 3D mesh or the like. The top touch surface 34 may be an A surface of a vehicle and thus any surface of high efficiency and quality as used in automotive designs.

Further details of the haptic actuator 1 are shown in FIGS. 1b to 2e in different views. Accordingly, the haptic actuator 1 comprises coil winding 10 around a coil core 12 and hold by a bobbin 11. The coil core 12 is ferromagnetic, and has a high magnetic permeability. It extends beyond the bobbin 11 and is fixedly attached to a base plate 40 via connection means 13, which may be in form of two feet, one on each side of the coil winding 10. A vibrating plate 16 is attached to the base plate 40 via spring means, which may be in form of two leaf springs 18, 19, one on each coil winding side where no coil core 12 is extending beyond the coil winding 10. Further, the vibrating plate 16 is non ferromagnetic, but fixedly attached to a ferromagnetic plate 14 extending at least partly parallel to the coil core 12 between the coil winding 10 and the base plate 40, via further connection means 15, which may be in form of four supports arranged on both sides of each spring 18, 19.

Thus, the vibrating plate 16 together with the ferromagnetic plate 14 can move relative to the base plate 40 up and down, as will be described in detail with respect to FIGS. 4a and 4b below. A damping material may be inserted between the ferromagnetic plate 14 and the base plate 40 to reduce an activation sound when current is running through the coil winding 10 to push the vibrating plate 16 up-wards in FIG. 2c. Additionally, the damping material may be inserted between the ferromagnetic plate 14 and the base plate 40 to reduce the sound when current is stopped running. Furthermore, damping material may be inserted between the coil core 12 and the ferromagnetic plate 14, which may reduce the activation sound when current is running.

Figure 3A:
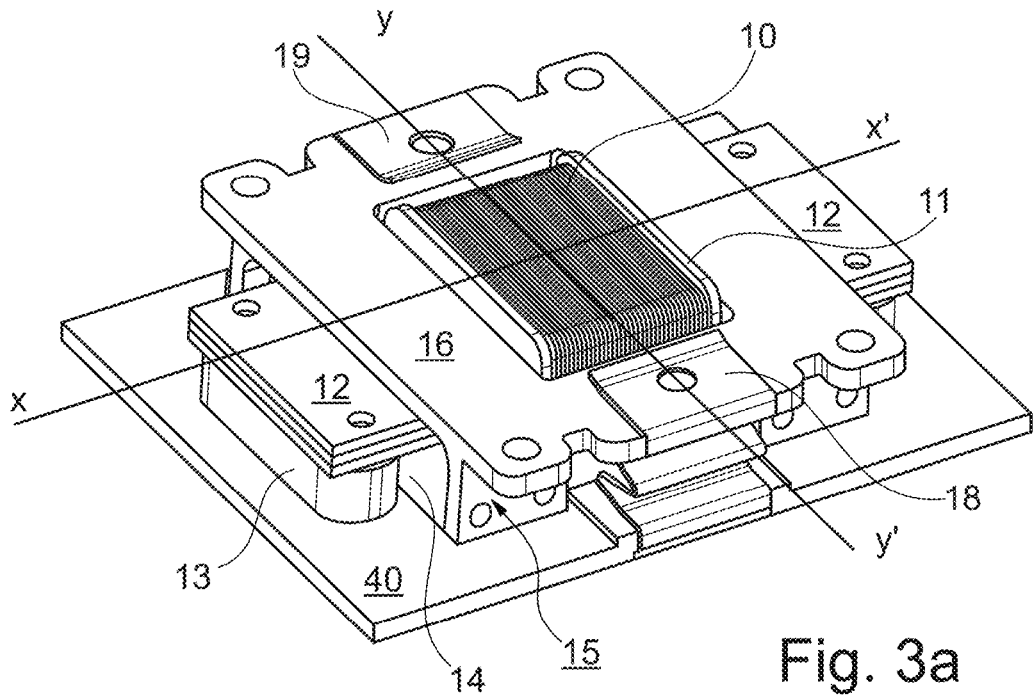
FIG. 3a is another perspective view of the haptic actuator of FIG. 1b.
Figure 3B:
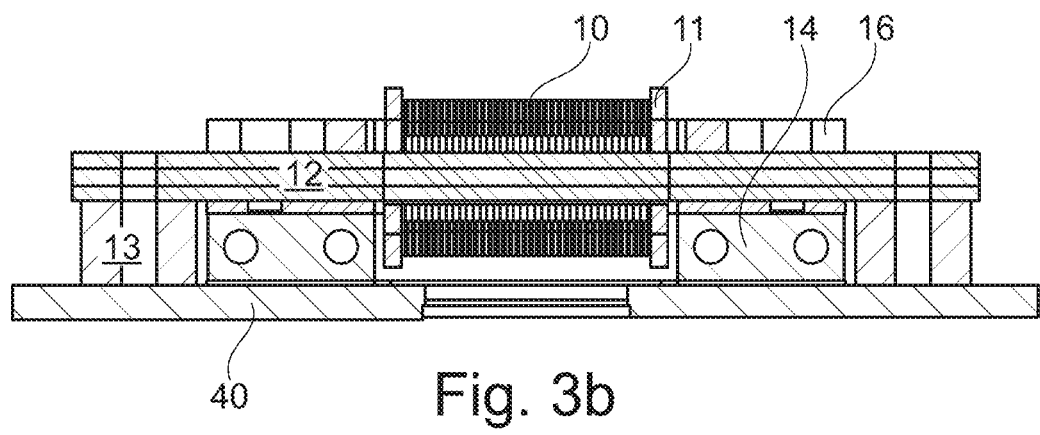
Figure 3C:
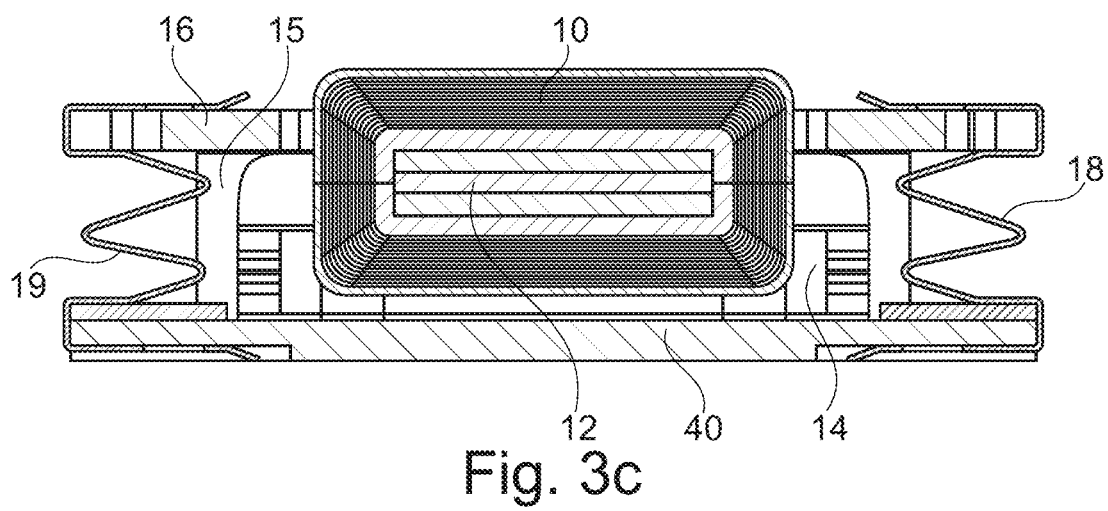

FIG. 3a provides a perspective view of the haptic actuator 1, whereas FIGS. 3b and 3c show cross-sections taken along the line X-X' and line Y-Y' in FIG. 3a, respectively, in order to reveal the relative spatial arrangement of all parts of the actuator 1 described above.

Figure 4A:
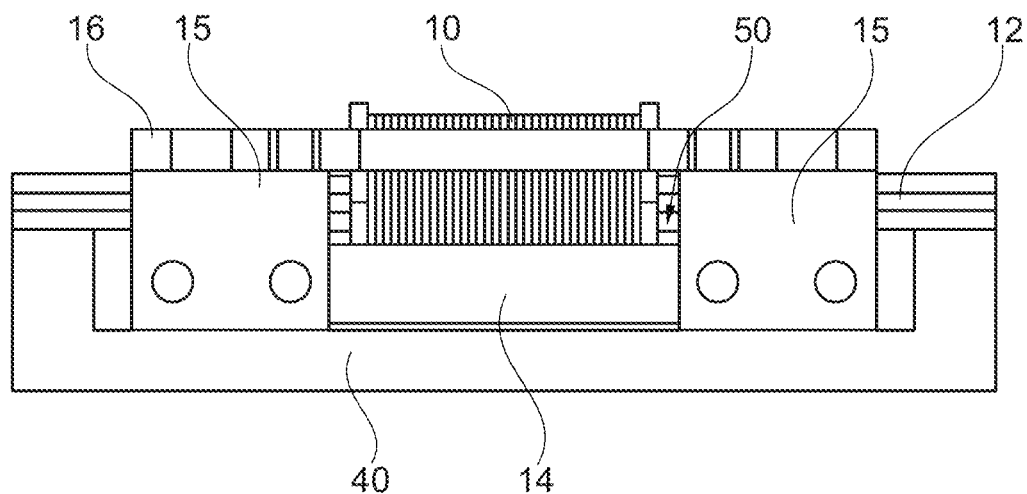
FIGS. 4a and 4b are side views of the haptic actuator of FIGS. 3a to 3c, in a not activated state and in an activated state, respectively.

As can be seen, for example, from FIG. 3b as well as FIG. 4a, the ferromagnetic plate 14 extends underneath the coil core 12 and is designed in such a way that it rests on the non-moving base 40. A gap 50 of below 300 μm is provided between the coil core 12 and the ferromagnetic plate 14 as long as no current is activating the haptic actuator 1. The gap is designed to be <300 μm, since most haptic vibrations do not require higher values. In the resting state, the ferromagnetic plate 14 as well as its connection to the vibrating plate 16 is "resting" on top of the base plate 40. During this state, any excessive force from outside will not stress the springs 18, 19, since movement has been restricted by the bottom plate 40.

Figure 4B:
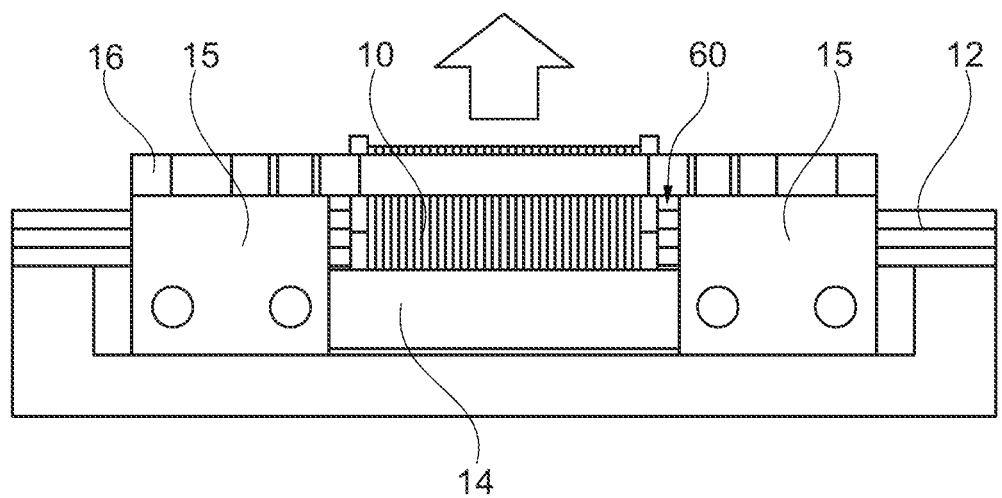

During haptic activation with current flowing through the coil winding 10, the ferromagnetic plate 14 moves closer to the coil core 12, making the gap 50 smaller, while a gap 60 opens between the coil core 12 and the vibrating plate 16, as the vibrating plate 16 moves upwards as shown in FIG. 4b by an arrow. Thus, during the activation state, when current is applied to the coil winding 10, the haptic actuator 1 is activated, and the ferromagnetic plate 14 is attracted/pulled to the coil core 12 which makes the gap 50 become smaller. The connection to the vibrating plate 16 transfers this movement to, for example, a printed circuit board and a top plate such as the substrate 30 and the touch surface 34 shown in FIG. 1a. This movement then is interpreted by a user's fingertip as active haptic feedback vibration.

The coil winding 10 is connected to the upper vibrating plate 16 via the springs 18, 19. Both, the springs 18, 19 and the vibrating plate 16 have to use non ferromagnetic material. The springs 18, 19 bring back the ferromagnetic plate 14 to its resting position shown in FIG. 4a when no current is applied. In detail, when the current is stopped, due to gravity and spring force in the arrangement shown in FIGS. 4a and 4b, the ferromagnetic plate 14 is brought from its activation position down again to its resting position.

The above-described structure of the haptic actuator 1 allows to arrange the actuators 1 as required, without a restriction to a horizontal arrangement. Thus, also an HMI as, for example, shown in FIG. 1 does not require a horizontal placement. Further, multiple actuation in sequence is possible to provide different haptic feedback to user.

Figure 5A:
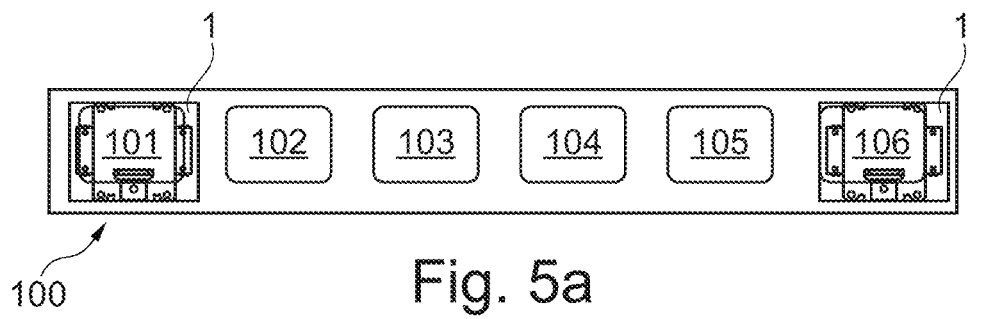
FIGS. 5a to 5c are top view views of three different HMIs.
Figure 5B:
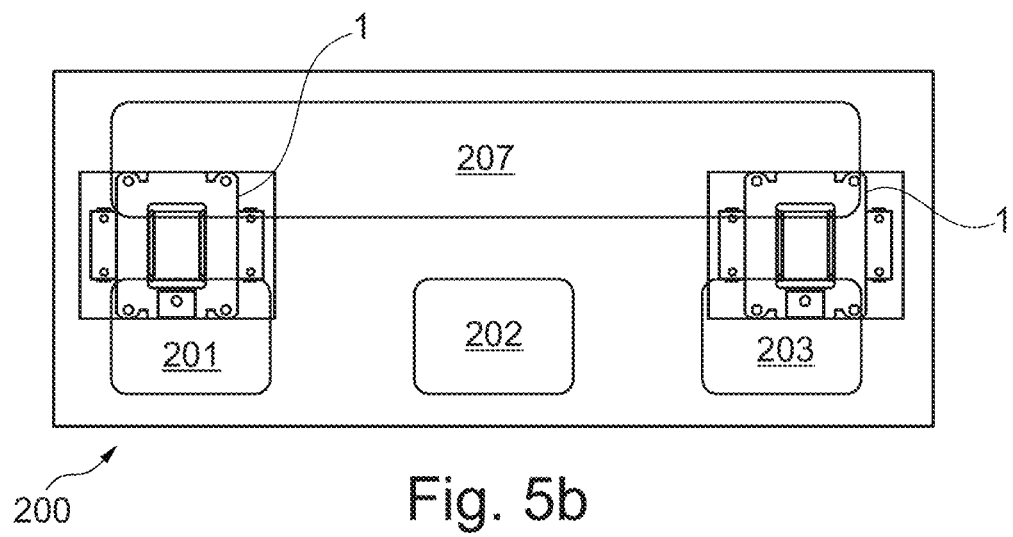
Figure 5C:
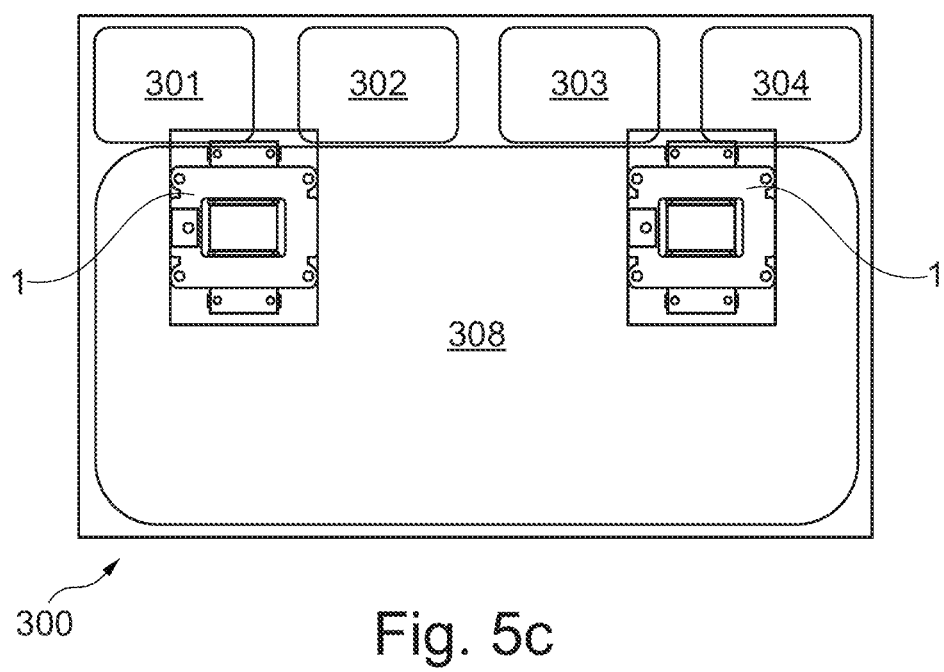

FIGS. 5a to 5c show how haptic actuators 1 may be place placed inside a HMI box enclosure.

Multiple actuators can be distributed underneath large HMI components, thanks to a relatively small form factor of each actuator 1, which may be approx. 60 mm length×45 mm width×12.5 mm height. The distribution of multiple actuators across wide surfaces also helps vibration uniformity across the whole surface.

FIG. 5a shows a HMI 100 with six buttons 101 to 106 with a haptic actuator 1 being arranged under button 101 and 106, respectively. The buttons 101 and 106 may have a size of 25 mm×25 mm size as usual within motor vehicles.

FIG. 5b shows a HMI 200 with one slider 207 and three buttons 201 to 203, with a haptic actuator 1 being arranged under button 201 and 203, respectively, as well as at both ends of the slider 207.

FIG. 5c shows a HMI 300 with one touchpad area 308 and four buttons 301 to 304. Haptic actuators 1 are arranged in the touchpad area 308 as well as associated with the buttons 302 and 304.

Implementation of actuators in vehicles is increasing. However most of the actuators that are presently used are not designed specifically considering the automotive use case. This brings new challenges on mechanical design to have a proper mechanical decoupling that ensure the components reliability and having a high efficiency on transmitting vibration of energy to HMI surfaces. The haptic actuator according to the present disclosure offers a simplicity for mechanical design since the mechanical decoupling is embedded on the actuator structure, while maintaining the energy transfer efficiency to surface and ensuring mechanical reliability at the same time.

It will be appreciated by those skilled in the art that changes could be made to the embodiments described above without departing from the broad inventive concept thereof. It is understood, therefore, that the invention disclosed herein is not limited to the particular embodiments disclosed and is intended to cover modifications within the spirit and scope of the present invention.

REFERENCE SIGNS 1 actuator
10 coil winding
11 bobbin, coil former
12 coil core
13 connection means
14 ferromagnetic plate
15 connection means
16 vibrating plate
18 spring
19 spring
30 printed circuit board with incorporated sensor
32 substrate
34 top touch surface
40 bottom, base plate
50 gap
60 gap
100 human machine interface
101-106 button
200 human machine interface
201-203 button
207 slider
300 human machine interface
301-304 button
308 touchpad area It is claimed:

1. An active haptic feedback device for a human machine interface, comprising:
    a fixed part comprising a coil winding on a bobbin and through which a coil core extends, which is fixed to a base plate;
    a moveable part comprising a ferromagnetic plate arranged between the coil core and the base plate, wherein the ferromagnetic plate has a resting state, when no current is applied to the coil winding, with a gap between the ferromagnetic plate and the coil core, and an activation state, when current is applied to the coil winding, with the gap being reduced due to a movement of the coil core away from the base plate and towards the ferromagnetic plate; and
    a vibrating plate arranged on a side of the coil core opposite to a side of the ferromagnetic plate such that the coil core extends at least partly between the vibrating plate and the ferromagnetic plate, wherein the vibrating plate is fixedly attached to the ferromagnetic plate and moveably attached to the base plate via springs, wherein the springs are configured to bring back the ferromagnetic plate to its resting position when no current is applied to the coil winding, from its activation position.

2. The active haptic feedback device according to claim 1, wherein
    the coil core comprises ferromagnetic material;
    the vibrating plate is made of non-ferromagnetic material; and
    connection means are made of non-ferromagnetic material.

3. The active haptic feedback device according to claim 1, wherein the springs comprise leaf springs, at least one on each side of the coil winding perpendicular to the extension of the coil core.

4. The active haptic feedback device according to claim 1 wherein the gap is up to 300 µm in the resting state.

5. The active haptic feedback device according to claim 1, wherein the active haptic feedback device has a length of up to 60 mm, a width of up to 45 mm and a height of up to 12.5 mm.

6. The active haptic feedback device according to claim 1, wherein
    damping means are arranged between the ferromagnetic plate and the base plate, and/or
    damping means are arranged between the coil core and the ferromagnetic plate.

7. A human machine interface with at least one active haptic feedback device according to claim 1.

8. The human machine interface according to claim 7, wherein a touch surface is arranged on the vibrating plate of the at least one active haptic feedback device, such that movement of the vibrating plate together with the ferromagnetic plate from the resting state to the activation state is in the direction towards the touch surface.

9. The human machine interface according to claim 7, wherein a printed circuit board with at least one incorporated sensor and a substrate is arranged between the touch surface and the at least one active haptic feedback device.

10. The human machine interface according to claim 7, further comprising:
- at least one button associated with an active haptic feedback device;
- at least one slide associated with at least two active haptic feedback devices; and/or
- at least one touchpad area associated with at least two active haptic feedback devices.

11. An automotive part with at least one human machine interface according to claim 7.

* * * * *